United States Patent [19]
Rhodes

[11] 4,072,762
[45] Feb. 7, 1978

[54] PROCESSES OF COOLING FOODS AND APPARATUS THEREFOR

[76] Inventor: Ignace Rhodes, c/o Electro Dispersion Corp., 36-16 29th St., Long Island City, N.Y. 11106

[21] Appl. No.: 243,025

[22] Filed: Apr. 11, 1972

Related U.S. Application Data

[63] Continuation of Ser. No. 806,008, March 3, 1969, abandoned, which is a continuation of Ser. No. 446,859, April 9, 1965, abandoned.

[51] Int. Cl.² .................................................. A23L 1/01
[52] U.S. Cl. .............................. 426/510; 99/DIG. 13; 99/451; 426/236
[58] Field of Search ............... 99/221, 90, 86, 107, 99/1, 353, 451, DIG. 13; 219/393; 426/235, 236, 510

[56] References Cited

U.S. PATENT DOCUMENTS

| | | | |
|---|---|---|---|
| 1,414,439 | 5/1922 | Snyder | 99/90 R X |
| 1,959,390 | 5/1934 | Smith | 99/221 |
| 1,965,609 | 7/1934 | Smith | 99/451 X |
| 2,097,233 | 10/1937 | Meston | 118/624 |
| 2,502,172 | 3/1950 | Paulsen | 99/90 R UX |
| 2,565,454 | 8/1951 | MacKenzie et al. | 99/451 |
| 2,585,799 | 2/1952 | Lawrence | 99/451 |
| 2,773,472 | 12/1956 | Lamm | 118/624 |
| 3,119,354 | 1/1964 | Gawlitza | 426/243 |
| 3,203,809 | 8/1965 | Visness et al. | 426/236 |
| 3,210,007 | 10/1965 | Doyle | 239/3 |

FOREIGN PATENT DOCUMENTS 749,202  5/1956  United Kingdom.

*Primary Examiner*—Steven L. Weinstein
*Attorney, Agent, or Firm*—Kirschstein, Kirschstein, Ottinger, Frank & Cobrin

[57] ABSTRACT

A process and apparatus for cooking food wherein the food to be treated is located in a chamber where it is subjected to heat, there also being present in the chamber steam that is either separately introduced or is generated by the food as it is being heated. This steam is forced into a layer surrounding the exposed surface of the food being treated by establishing in the chamber an electrostatic field of substantially constant polarity while the food is supported on a grounded hearth. This electrostatic field is created by applying a high voltage direct current potential to a grid located above the food being treated and preferably also disposing a ground above the grid and between the grid and the roof of the chamber in which the food is being treated.

8 Claims, 4 Drawing Figures

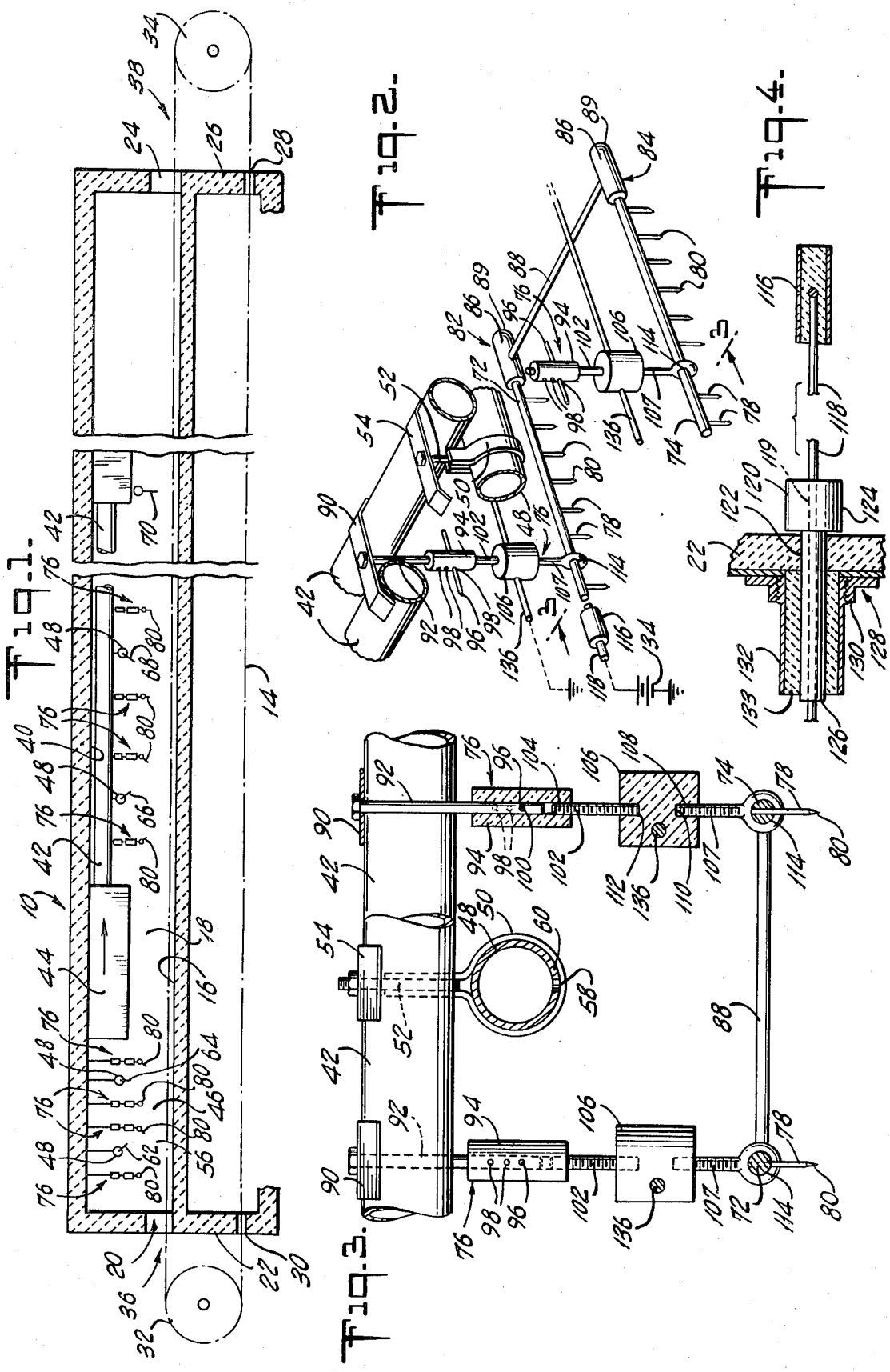

PROCESSES OF COOLING FOODS AND APPARATUS THEREFOR

CROSS-REFERENCE TO RELATED APPLICATIONS

This application is a continuation of my copending application Ser. No. 806,008, filed Mar. 3, 1969 for PROCESSES OF COOKING FOODS, AND APPARATUS THEREFOR, now abandoned, which in turn is a continuation of my application Ser. No. 446,859, filed Apr. 9, 1965 for PROCESSES OF COOKING FOODS, AND APPARATUS THEREFOR, the latter application now being abandoned, but having been copending with application Ser. No. 806,008.

A specific application of the invention has been found in the baking of certain baked goods, such as bread, rolls and the like. The invention has been found to be applicable in other cooking processes, as, for instance, in the cooking, including broiling or baking of meat. Particular description is here set forth in connection with a baking process. It is to be understood that other applications are possible and intended. Thus, when the term, "baking," or the term, "baked goods," is used in specification or claim, such terms are not intended to be limiting, but are intended to be inclusive of the application to food preparation, whether for bakery goods or any other food products capable of utilizing the principles of the invention.

It has been the practice to introduce live steam into a baking oven or other chamber in which food is being baked, or otherwise cooked. For instance, particular applications have been made in the manufacture of certain baked goods such as hearth baked bread, hearth baked rolls, bread baked in pans with lids, and some cakes. A high degree of humidity, even of super-saturation, immediately at the food being heated, has been found desirable, indeed almost requisite, for speedy and proper control of the cooking processes, to slow up the formation of crust too early in the baking process, as well as to control the baking time. In baking, a highly humid atmosphere immediately at the exposed surfaces of the baking goods has been found necessary in order to reduce, even to eliminate, "cracking" or "splitting" of the exposed surfaces of the goods being baked.

Obviously, the heat of the oven, and the property of steam to rise, oppose the directional effects of nozzles or similar devices which may be used to direct steam toward the baking bodies within the oven. While steam has been discharged in most cases through nozzles, too high a velocity for the steam as it issues from the nozzles is undesirable as it may stir up loose flour or other materials with which the baking goods may have been dusted, and cause these materials then to sift down and deposit on the exposed surfaces of the goods being baked.

Steam generally is delivered into the chamber through steam-pipes located at the top of the chamber, since these pipes must be located away from the baked goods themselves. The heat for the baking operation may be derived from any one of a plurality of sources; in many cases, the members from which the heat in derived, capable of being located at one or more of various positions in the baking chamber, generally are located near the roof of the oven chamber. The heating members may be of various types, using a medium, for instance, such as gas or the like, or even electricity. In any case, since the heating members generally are located at the top of the chamber, the heat delivered to the baked goods is radiant heat. The jets for directing steam at the baked goods likewise are located in the same area, at the top of the chamber. The result is that before the steam jets can be effective to increase the humidity at the exposed surfaces of the baking goods, the steam has become superheated and dry.

Thus, a problem is presented as to how to assure that the steam remain wet and descend quickly, after its entrance into the chamber, to the level of and to surround the goods which are moving through or have been placed in the oven chamber, and to overcome the inherent tendency of the steam to rise, as it is heated, and to locate itself adjacent the roof of the chamber.

It is an object of the invention to provide a process, and means for implementing that process, whereby steam will be caused to move from its point of entry into the chamber downwardly to and even around the goods moving through or positioned in the chamber.

It is an object of the invention, as just set forth, to provide a process and means, in relation to steam introduced into the chamber, wherein the pressure necessary for the injection of the steam into the chamber may be reduced or even eliminated as a factor in effecting flow of the steam down to and around the baking goods. For this purpose, means are interposed in the chamber with relation to the steam inlet and the goods, which means will cause the steam to flow in the chamber down to and around the baking goods.

Where steam has been introduced into the chamber by means of high pressure, the resultant high velocity of the injected steam additionally caused superheating. Since wet steam is desirable, if not almost essential, for satisfactory operation, superheating necessarily hindered the effectiveness of the operation by substantially reducing and even eliminating the "wetness" or free moisture content of the steam. Since the cooking or baking processes are greatly enhanced when the steam is "wet," systems have been devised heretofore to saturate the steam with moisture before it enters the chamber to reduce the effect of this superheating.

It is an object of the invention to provide a process, and apparatus for effecting that process, whereby it no longer is required that the steam have attained a high velocity in order to cause it to flow down to and around the bodies being processed, and thus superheating is reduced or eliminated so that normally "wet" steam will retain its desirable properties and will be effective to a high degree in the chamber.

For certain of the purposes of the invention, a high potential electrostatic means is set up within the chamber, at least at one portion of the chamber such as the entrance end where the goods are being moved into the chamber, and where the steam injection means is located. By applying to this high potential electrostatic means a high potential, single polarity voltage, it has been found possible to cause the injected steam to move downwardly from the position where it is injected into the chamber initially, to the baking bodies on the hearth of the oven chamber. It has been found that creation of such a high electrostatic potential in close proximity to the steam injection means causes positive movement of the steam from the position of the steam sources near the ceiling of the oven downwardly to the hearth, and around the goods on the hearth.

It is an object of the invention to provide, in connection with the process of baking goods, means to facilitate the baking operation, and to prevent the formation of crust on the bread at too early a stage in the baking operation, and to assure that steam will move into position to cooperate with all the faces of the goods exposed to the direct radiant heat, including the top faces and sides.

It is particularly important in those cases where high pressure steam has been used, where cornmeal has been applied to the hearth, as, for instance, in the baking of break known as "Jewish rye," and Italian bread. In such cases, the high pressure steam jets have been found to agitate the cornmeal so that it would fly up from the hearth, and then come to rest upon exposed faces of the baked goods, giving the baked goods an undesirable appearance. The process and apparatus here involved has eliminated the necessity for the use of high pressure steam so that this undesirable effect does not result.

The discussion heretofore has been concerned with the use of the directional high potential electrostatic field in association with steam injected into the baking or cooking chamber of the oven. Also the description to follow is concerned with one modification involving what amounts to a moving hearth. However, the principles here involved appear to have even wider application. It is obvious, of course, that food being processed liberates a quantity of steam. That steam rises immediately from the food and is replaced by other steam being liberated. The loss of steam from the cooking material involves loss of heat units. It has been found possible to speed up the cooking process, without injection of any additional steam into the chamber, but merely by establishing the high potential electrostatic field above the cooking material, and thus to restrain the liberated steam from rising away from the cooking material. Thus, while steam is being liberated, and is dissipated finally, an extremely moisture-saturated atmosphere at the temperature of the liberated steam is maintained at the surface of the cooking material.

It has been found that the cooking time is reduced by such processing. This makes it clear that the established high potential electrostatic field not only will cause steam injected into the chamber to flow down around the material being cooked, but will cause steam liberated from the cooking material to maintain a highly humid and hot atmosphere immediately surrounding the cooking or baking material. This processing has been found effective in cooking goods such as meat in large, open containers in large ovens. Where, in the past, as such cooking proceeded, quantities of gravy previously prepared other than from the food being cooked had to be added to compensate for the water lost as steam, the amount of replenishing gravy was sharply reduced by using the high potential electrostatic field over the containers in which such cooking was taking place.

Other objects of the invention will be set forth hereinafter, or will be apparent from the description and the drawings, in which are illustrated embodiments exemplifying the invention.

The invention, however, is not intended to be restricted to any particular construction, or any particular arrangement of parts, or any particular application of any such construction or arrangement of parts, or any specific method of operation or use, or any of the various details thereof, even where specifically shown and described herein, as the same may be modified in various particulars, or may be applied in many varied relations, without departing from the spirit and scope of the claimed invention, of which the exemplifying embodiments, herein shown and described, are intended only to be illustrative, and only for the purpose of complying with the requirements of the Statutes for disclosure of an operative embodiment, but not to show all the various forms and modifications in which the invention might be embodied.

On the drawings, in which the same reference characters refer to the same parts throughout, and in which are disclosed such practical constructions, FIG. 1 is a longitudinal vertical cross-section, illustrating, to some degree diagrammatically, the arrangement of a baking oven, with a moving hearth, the oven being broken away in its length, and the bottom foundations of the oven being broken away;

FIG. 2 is a perspective view of a portion of the apparatus installed into the oven and embodying features of the invention, the parts being shown to enlarged scale;

FIG. 3 is a detail cross-sectional view, to enlarged scale, substantially as the apparatus of FIG. 2 appears on the line 3—3; and FIG. 4 is a vertical cross-sectional view of a detail of the apparatus at the position where parts of the high tension means extend through the wall of the oven, parts being broken away.

On the drawings (FIG. 1) there is depicted an oven 10 having a hearth which may take the form of a continuous belt 14 spaced from and moving above a stationary hearth 16 in a heating chamber 18. The belt forms a moving hearth from its point of entry into the chamber through an opening 20 in a wall 22, extending the entire length of the chamber to its exit from the chamber at an opening 24 in end wall 26. The belt returns from exit opening 24 by turning downwardly, then passing through another opening 28 in wall 26, extending beneath chamber 18, and then passing through another opening 30 in wall 22, to turn upwardly to pass through opening 20. Pulleys 32 and 34 may be utilized for carrying and providing movement to the belt. These pulleys are shown diagrammatically as located at positions externally of the chamber; any suitable means for mounting and driving such a belt may be provided.

The belt may be mad up of plate-like members or the like, forming, as it were, links in a chain, to have the goods to be processed positioned thereon. Thus, the operation may be made continuous, baked goods (not shown) being placed in position upon the belt at loading point 36, and being removed from the belt at unloading point 38.

Ceiling 40 of chamber 18 may be positioned the usual distance above hearth 16 and belt 14; thus, the process and apparatus of the invention may be adapted to ovens presently in existence. In ovens to be installed, it may be found desirable to provide substantial spacing below ceiling 40 to accommodate certain parts of the apparatus, and to assure some of the results sought.

Any suitable means may be utilized as a source of heat for the goods in the oven. In one instance, as shown on the drawings, tubes 42 may extend for substantially the entire length of the oven from a header 44. Header 44 may be positioned in the chamber; in this case, the header is located close to but not directly at the end of the chamber near loading point 36. The tubes are connected to the header. Hot gases are blasted into header 44 from a suitable source, as, for instance, a burner; the hot gases then proceed from the header through the tubes which radiate heat into chamber 18 through which belt 14 is moving.

At portion 46 of chamber 18, adjacent loading point 36, where the belt enters the chamber and the goods are first subjected to the hot atmosphere of the oven chamber, means are disposed for the injection of steam into the atmosphere of chamber 18. Such injection means may take any suitable form to accomplish this result. It has been found that many of the results here described are attained without the positive injection of steam into the chamber, but merely by working with the steam derived entirely from the goods being heated in the oven. For certain operations, however, as in the structure illustrated on the drawings, steam pipes 48 are disposed crosswise of chamber 18 and of tubes 42 (FIG. 2). Any suitable means may be utilized to suspend the steam pipes with relation to ceiling 40. One such means may be straps 50, passed around pipes 48 and carried by a suspender 52 anchored to a crosspiece 54 straddling a pair of tubes 42. The pipes may be shielded at the top and sides, although such shielding, considered requisite is usual installations, is not necessary under the circumstances here. Thus, in the structure shown on the drawings, all such shielding has been omitted. However, suspenders 52 support pipes 48 from tubes 42.

Steam pipes 48 may be positioned in the spaced intervals (FIG. 1) shown in portion 46. However, in the first section 56 it is desirable that there be no heating tubes 42. Pipes 48 may be provided with nozzles, or, as shown in FIG. 3, openings 58 may be formed in the lower portions 60 of the pipes to serve as nozzles. Such openings may be disposed at spaced intervals along the lenghts of the pipes, and at slightly spaced radial intervals. Such openings generally point downwardly, but at angularly different directions to cause the steam to move downwardly, but in differently angled directions toward the goods on the hearth. For instance, as illustratively indicated by diagrammatic pointing fingers for the different pipes in FIG. 1, openings 62 of pipes 48 immediately at opening 20 are angled in the direction in which the baked goods are being moved by belt 14; openings 64 point their blasts of steam downwardly; openings 66 and 68 may be formed to direct their blasts downwardly, but toward each other. The purpose here is to put the steam into action in relation to the baking goods at the very inception of the baking or working operation, and thus to concentrate the steam properly over the exposed surfaces of the baking goods, and thereby to reduce the crust formation during the early stages of the baking operation. Thus, as the goods swell, elimination of cracking or side splitting results, while effective transmission of heat to the baking goods is accomplished at the very inception of the baking operation.

A damper 70 may be located at the end of portion 46 to restrict as much as possible steam from moving along belt 14 beyond portion 46. Although, on the drawing (FIG. 1), but a short distance appears from damper 70 to wall 26, the oven is shown broken away to indicate that a large portion of the oven beyond damper 70 has not been shown on the drawing although it is present and functions in the completion of the baking process after the initial baking operations here shown and described.

Heat being radiated from tubes 42 will cause heating of the steam being emitted from openings 58, 62, 64, 66 and 68, so that the steam would tend to rise. At the same time, such heating would tend to dry or superheat the steam, so that the desired saturation would be lost, with distinct loss in the ability of the steam to assist the baking operations. It is necessary to cause the steam, after being injected into the baking chamber, to move as quickly as possible down to the goods on the hearth. For this purpose, means for introducing an electrostatic high potential is located, as, for instance, by being suspended within chamber 18 at portion 46, in the areas in which which steam is active in the chamber. For purposes of illustration, a pair of conductors 72 and 74 (FIG. 2) are shown as suspended by hangers 76 at this location. These conductors, which may take any desired form, may consist of electrical conducting rod or wire of round or any other desired cross-section. It has been found that bars which are knife-shaped in cross-section function well in carrying out the purposes of the invention, the sharp edges pointing downwardly.

Conductors 72 and 74 may be made more effective by providing each conductor with a plurality of pointed pins 78, secured to conductors 72 and 74 in any desired manner, preferably so that points 80 are directed downwardly toward belt 14. The pins may be assembled with conductors 72 and 74 by being press fitted into openings formed in the conductors.

It is obvious from the drawings that, where steam pipes 48 are located in the oven chamber, the steam pipes should be spaced from conductors 72 and 74 a distance sufficient so that pipes 48 will not cause too much of a loss through pipes 48 to ground of the electrostatic discharge from such diffusion members as points 80. For this purpose, it has been considered desirable to maintain a spacing of about 4 inches between any pipe 46 and an adjacent conductor 72 or 74.

Conductors 72 and 74, at ends 82 and 84, may have members 86 pressed on. Opposed members 86 are connected by means iof a rod 88. Free ends 89 of members 86 are rounded off, to eliminate any corona effects at the high potentials to be applied in operation. Conductors 72 and 74, members 86, and rod 88 are electrically coupled together in this manner, and conductors 72 and 74 are restrained against any twisting out of the frame formed by conductors 72 and 74, and rod 88.

Conductors 72 and 74 are suspended below ceiling 40 by means of hangers 76 each of which may include a plate 90 which straddles a pair of tubes 42. The plates have curved or angularly directed ends to complement the rounded contour of the tubes, and to locate the plates against movement with relation to the top surfaces of the tubes upon which they rest. Depending from a central portion of each plate 90 is a rod 92. A sleeve 94 receives the end of rod 92. A pin 96 is extended through aligned openings 98 and 100 on rod 92 and sleeve 94 to hold them together. A plurality of openings 98 permit vertical adjustment of the assembly.

Another rod 102 is threaded into the threaded bore 104 of sleeve 94, and is also anchored in an insulator 106 (FIG. 3). An eyelet 107 is threaded into a threaded bore 108 of insulator 106 so that end 110 of the eyelet is separated from end 112 of rod 102. A conductor 72 or 74 is received through opening 114 of an eyelet 107 of one of hangers 76. Thus, conductors 72 and 74 are located with relation to ceiling 40 and steam-pipes 48, and the distances may be adjusted by use of pin 96 and the threaded connections of rods 92 and 102, and eyelets 107 with sleeve 94 and insulator 106. Also it is to be noted that conductors 72 and 74 are capable of being turned with relation to opening 114, and thus adjust the angular position of pins 78. In this manner, as shown diagrammatically (FIG. 1), the angular direction of the electrostatic discharge off points 80 may be changed as the installer finds necessary, as, for instance, to keep the steam within a defined area of portion 46.

Conductor 72, at its other end, may terminate in a pressed-on member 116 similar to member 86. From member 116 there extends a rod 118 which then may be received in the bore 119 through an insulator 120. A plurality of conductors 72 may be connected to a single rod 118.

An opening 122 may be formed in wall 22 (FIG. 4). Insulator 120 includes an enlarged portion 124 positioned within the chamber, and a portion 126 of reduced cross-section which extends through opening 122 to the outside of wall 22. Secured to the wall at the outside of wall 22 may be a flanged member 128 which has a threaded nipple 130. A threaded metallic sleeve 132 may be engaged in nipple 130. Fire clay or similar insulating material 133 may be packed into the space between sleeve 132 and portion 126, and thus seal against the movement of gases, and also against the discharge of electricity from rod 118.

Externally of the oven, rod 118 may be connected to a suitable source 134 of a high voltage direct current potential, which is diagrammatically shown (FIG. 2). Such source obviously would be grounded. Such potential may be produced by means of rectification of an alternating current which may have been stepped up in the first instance. In certain actual operations, voltages in the area of 20,000-to-25,000 volts D.C. were used.

Oven 10 and its hearths, including belt 14, are grounded. Except for leakage of electricity discharged from conductors 72 and 74, as, for instance, where the conductor has a knife edge, or has pins 78 associated therewith, no substantial current is intended to flow. There is a detectable electrical discharge, however. That electrical discharge tends to move from conductors 72 and 74 to ground, whether that ground be the hearth, or other ground. Ceiling 40 is grounded, as is the hearth. The possibility of a discharge reversely from that desired is countered, and discharge only in the direction from conductors 72 and 74 to the hearth is emphasized, by means of a ground wire 136 (FIG. 2). This ground wire takes the form of a rod which is extended between and through insulators 106, but is not directly connected to and does not absorb any electrical charge from either eyelets 107 or rod 102. The effect of wire 136, which is grounded, is actually not to absorb the discharge coming from conductors 72 and 74, but to reflect or repel, as it were, any such discharge toward the hearth. Ground wire 136 is diagrammatically shown as grounded.

The action of conductors 72 and 74, at the high potential, is to cause steam being discharged from the various discharge openings of the steam pipes to move downwardly to the hearth. It has been observed that the steam is caused to flow not only to the top, but also along the sides of the baking goods. It would appear that a charge is being imparted to the steam by conductors 72 and 74, and pins 78, and that the steam is caused thereby to move to the hearth there to give up its charge. The operation might be explained on the basis that the high voltage causes the moisture, which normally would be dissipated from the baking goods, to flow back to, possibly into, the goods themselves, and thus cause better penetration of heat into the baking goods. It is considered that the presence of saturated steam immediately in the area of the baking goods is conducive to increasing the speed of baking. Thus, whether the steam be obtained from outside sources, or from the baking goods themselves, the rate of baking is speeded up. By forcing the steam to be maintained in the atmosphere immediately at the baking goods themselves, the time for baking is measurably decreased.

The invention may be applied not only in connection with a moving hearth, but also where the baking goods are positioned upon a stationary hearth. In such cases, as, for instance, in baking Jewish rye, Italian bread, or the like, where cornmeal or other powdery substances may be spread upon the hearth, such powdery substances are not stirred up since high velocity injection is found no longer to be necessary. Also, it appears that some ozone may be formed during the action of the high voltage source. This ozone, thus produced, appears to be helpful in the proper formation of crust on the baking goods.

In one installation, ground wire 136 was made from ⅛ inch rod; conductors 72 and 74 were made from ⅜ inch bar; rod 88 was ¼ inch in diameter; generally ground wire 136 may be of a cross-section about one-half that of conductors 72 and 74. For instance, if ¼ inch rod is used for conductors 72 and 74, ground wire 136 may be ⅛ inch. Pins 78 were spaced about 2 inches apart. It is desirable that the material of these parts should be rust resistant, as, for instance, by fabrication from stainless steel. In the case here illustrated, conductors 72 and 74 and their accompanying pins were located above the hearth at a distance of about 8½ inches. This was related to the height of the baking goods passing over the hearth, which, in that case, was between 3 and 6 inches.

Where steam had been injected into the oven chamber without the use of the electrostatic high voltage here described, pressures of from 4 to 6 pounds had been used in the past. With the utilization of the electrostatic high voltage here provided, it has been found that a pressure not in excess of 1 to 1½ pounds was sufficient. With steam at the lower pressure, wetter steam was possible. In those instances where conductors 72 and 74 cannot be spaced a considerable distance below ceiling 40, a material such as Transite may be applied to the ceiling to insulate the ceiling for heat and electrical protection.

Many other changes could be effected in the particular constructions, and in the methods of use and construction, and in specific details thereof, hereinbefore set forth, without substantially departing from the invention intended to be defined herein, the specific description being merely of embodiments capable of illustrating certain principles of the invention.

What is claimed as new and useful is:

1. In a process of cooking food, which process includes cooking the food in a chamber, supporting the food in the chamber on a grounded hearth while heating the food in a chamber from a high temperature source within the chamber external to the food and providing steam in the chamber: wherein the improvement comprises creating and maintaining a hot and highly humid atmosphere immediately surrounding the exposed surface of the food in the chamber at an early stage of cooking so as to speed up the cooking process while localizing the steam in the vicinity of said exposed surface of the food as it is being heated, creating and maintaining said aforesaid atmosphere and localizing the steam by suspending in the chamber above the hearth a grid of electrically conductive downwardly extending pins with lower pointed ends, said pins being electrically insulated from the hearth, and connecting a source of high potential DC to said grid sufficient to cause steam to move downwardly to the hearth and food thereon thereby establishing in the chamber, in conductive relationship to the atmosphere above the said surface of the food exposed in the chamber, at an early stage of cooking, a direct current high potential electrostatic field between the grid and the food articles on the grounded hearth.

2. A process as set forth in claim 1, the further step of located a grounded conductor above the grid and below the roof of the chamber.

3. A process as set forth in claim 1 including moving the food relative to the chamber and conductor as the food is cooked therein.

4. A process as set forth in claim 1 which further includes the step of introducing the steam into the chamber above the food on the hearth at an early stage of cooking and wherein the electrostatic field moves the steam downwardly to surround the exposed surface of the food in the chamber at said early stage of cooking.

5. A process as set forth in claim 1 wherein the steam is introduced into the chamber by vaporization of water from the food in the chamber.

6. A cooking apparatus including a cooking chamber, a hearth in said chamber, said hearth being composed of electrically conductive material, said chamber having a loading station adjacent a portion of the hearth for placement on said hearth portion of a food article just introduced into the oven, and means constituting a high temperature source of heat within the chamber and external to the food articles to supply heat to the chamber, wherein the improvement comprises means to maintain a hot and highly humid atmosphere immediately surrounding the exposed surface of the foot article in the chamber at an early stage of cooking so as to speed up cooking of the food articles by localizing steam in the chamber in the vicinity of the exposed surfaces of the food articles as the food articles are being heated in the chamber at an early stage of cooking, said last-named means comprising means to ground the hearth, a grid of electrically conductive downwardly extending pins with lower pointed ends, means to suspend said pins in the chamber above the hearth, means to electrically insulate said pins from the hearth, a source of high potential DC sufficient to cause steam to move downwardly to the hearth and food thereon, and means to connect said source to said grid and thus to create a high potential DC electrostatic field in the atmosphere of the chamber between the grid and the food articles on the grounded hearth.

7. An apparatus as set forth in claim 6 wherein a grounded electrically conductive member is disposed above the grid and below the roof of the chamber.

8. An apparatus as set forth in claim 6 wherein means is included to move the food articles relative to the source of high potential DC.

* * * * *

UNITED STATES PATENT AND TRADEMARK OFFICE
CERTIFICATE OF CORRECTION

PATENT NO. : 4,072,762
DATED : February 7, 1978
INVENTOR(S) : IGNACE RHODES

It is certified that error appears in the above-identified patent and that said Letters Patent are hereby corrected as shown below:

[54] Change the title of the case to read:

PROCESSES OF COOKING FOODS AND APPARATUS THEREFOR

Signed and Sealed this

Twenty-seventh Day of June 1978

[SEAL]

Attest:

RUTH C. MASON
Attesting Officer

DONALD W. BANNER
Commissioner of Patents and Trademarks